(12) United States Patent
Körner

(10) Patent No.: US 11,586,423 B2  
(45) Date of Patent: Feb. 21, 2023

(54) AUTOMATIC DERIVATION OF SOFTWARE ENGINEERING ARTIFACT ATTRIBUTES WITH INTEGRATED DISTRIBUTION CALCULATION

(71) Applicant: Siemens Aktiengesellschaft, Munich (DE)

(72) Inventor: Christian Körner, Bergen (DE)

(73) Assignee: SIEMENS AKTIENGESELLSCHAFT, Munich (DE)

(*) Notice: Subject to any disclaimer, the term of this patent is extended or adjusted under 35 U.S.C. 154(b) by 0 days.

(21) Appl. No.: 17/409,221

(22) Filed: Aug. 23, 2021

(65) Prior Publication Data

US 2022/0066743 A1  Mar. 3, 2022

(30) Foreign Application Priority Data

Aug. 25, 2020 (EP) .................................. 20192519  
Aug. 26, 2020 (EP) .................................. 20192810

(51) Int. Cl.
- *G06F 9/44* (2018.01)
- *G06F 8/10* (2018.01)
- *G06F 8/77* (2018.01)

(52) U.S. Cl.  
CPC . *G06F 8/10* (2013.01); *G06F 8/77* (2013.01)

(58) Field of Classification Search  
None  
See application file for complete search history.

(56) References Cited

U.S. PATENT DOCUMENTS

| 8,635,204 B1* | 1/2014 | Xie | ........................... G06F 8/71 707/E17.075 |
| 2009/0187444 A1* | 7/2009 | Zhuk | ..................... G06Q 10/10 705/7.14 |

(Continued)

OTHER PUBLICATIONS

Search Report for EP Application No. 20192519.5, 8 pages, Feb. 15, 2021.

*Primary Examiner* — Qamrun Nahar  
(74) *Attorney, Agent, or Firm* — Slayden Grubert Beard PLLC

(57) ABSTRACT

Some embodiments of the teachings herein include a computer-implemented method for automatic derivation of attributes of software engineering artifacts arising from technical boundary condition of product or service development segments comprise: deducing technical requirements using an automated software-based process based on classifications of the technical boundary conditions; mapping the deduced technical requirements of the artifacts to engineering disciplines and concerns using an automated software-based process; mapping the calculated engineering artifacts to responsibilities; adapting the classification of the technical boundary conditions based on the evaluation results in iterations; and processing an executable performing a distribution calculation of the classification space, wherein the distribution calculation of the classification space is at least based on a distribution and quartiles. The process of the executable comprises: calculating combination vectors at system start; reading mapping data and calculation probabilistic distribution and quartiles; and publishing new distribution to engineering goal calculation.

13 Claims, 6 Drawing Sheets

(56) References Cited

U.S. PATENT DOCUMENTS

| | | | |
|---|---|---|---|
| 2009/0319313 A1* | 12/2009 | Subash | G06F 8/10 717/104 |
| 2010/0153473 A1* | 6/2010 | Gopalan | G06F 8/10 707/810 |
| 2018/0196814 A1* | 7/2018 | Ferguson | G06F 16/24578 |

* cited by examiner

AUTOMATIC DERIVATION OF SOFTWARE ENGINEERING ARTIFACT ATTRIBUTES WITH INTEGRATED DISTRIBUTION CALCULATION

CROSS-REFERENCE TO RELATED APPLICATIONS

This application claims priority to EP Application No. 20192810.8 filed Aug. 26, 2020 and EP Application No. 20192519.5 filed Aug. 25, 2020, the contents of which are hereby incorporated by reference in their entirety.

TECHNICAL FIELD

The present disclosure is directed to software engineering. Various embodiments of the teachings herein include computer-implemented methods and/or computer systems for automatic derivation of attributes of software engineering artifacts, as well as respective computer programs and/or computer-readable storage media.

BACKGROUND

To achieve a certain product or service quality, artifact quality must be aligned across a variety of engineering disciplines, especially software engineering disciplines depending on the underlying task or challenge. Unaligned artifact quality creates quality deficits. Up to now, no technical solution is provided to this sort of problem. Organizational or non-technical procedures are applied sometimes to create consistent attributes for software engineering artifacts, meaning engineering goals, but usually fail to create alignment especially for fairly complex systems or frequent changes in the development task. With any up-to-date distributed methods or systems on a plurality of processes and/or subsystems respectively, any system interruption impedes a continuous workflow.

SUMMARY

In view of this, the teachings of the present disclosure include methods for successful implementations of projects, product, or service developments that allow for an efficient evaluation of an increased number of requirements within less or the same time to calculate a consistent set of software engineering artifact attributes. For example, some embodiments include a computer-implemented method for automatic derivation of attributes of software engineering artifacts, which attributes arise from technical boundary condition of product or service development segments, comprising the measures: deduction of technical requirements by an automated software-based process based on classifications of the technical boundary conditions, mapping the deduced technical requirements of the artifacts to engineering disciplines and concerns by an automated software-based process, mapping the calculated engineering artifacts to responsibilities, adaption of the classification of the technical boundary conditions based on the evaluation results in iterations, processing an executable performing a distribution calculation (DC) of the classification space, wherein the distribution calculation (DC) of the classification space is at least based on a distribution and quartiles, wherein the process of the executable comprises the steps of: calculation of the combination vectors at system start, reading mapping data and calculation probabilistic distribution and quartiles, and publishing new distribution to engineering goal calculation.

In some embodiments, the reading and calculation step and the publishing step are separated.

In some embodiments, the distribution calculation algorithm calculates the probability of a value in the distribution of a number of combinations and the quartiles underlying the engineering difficulty calculation are derived from the accumulated probabilities for each value.

In some embodiments, the distribution calculation (DC) of the classification space is based on a calculation of a multi-selection in technical boundary taxa and a calculation of distribution and quartiles.

In some embodiments, the method further includes the measures: normalization of the selection-counts, especially the multi-selection counts, creation of value-probability-pairs to calculate the probability of a value in the distribution calculation, and distribution Calculation (DC) from these value-probability-pairs.

In some embodiments, the method further includes the measures: count data for frequency distribution per segment, prioritization of combinations to segment frequency distributions, and combination of segment frequency distributions to a classification space frequency distributions.

In some embodiments, the method further includes the measures: horizontal stripping, wherein blocks of the solution space are given to separate threads by provided disjunct index subsets, and therefrom resulting buffered frequency distributions are merged into the combined result in parallel by providing disjunct frequency distributions' values to the threads.

In some embodiments, the method further includes the measure vertical stripping, wherein 2 or more segments' frequency distributions are combined to a combined frequency distribution, which combined frequency distribution further is reduced to a value-probability-pair frequency distribution and wherein these combination and reduction steps are repeated until all product or service development segments are frequency distributions are combined.

In some embodiments, the distribution calculation results are stored and evaluated for further subjecting the calculation results to a metric based ranking.

As another example, some embodiments include a computer system for automatic derivation of software engineering artifacts, comprising the components: a classifier software component for the classification of the technical boundary conditions, a calculation software component for the deduction of the technical requirements, a first mapping software component for mapping the technical requirements to engineering artifacts, an I/O-component for receiving the technical boundary conditions data and for providing the calculation results, a storage component, and comprising a distribution calculator software component for the distribution of the classifications, an executable performing a distribution calculation (DC) of the classification space, providing the distribution calculation (DC) of the classification space, which is at least based on a distribution and quartiles, wherein the executable comprises the further software components for: calculation of the combination vectors at system start, reading mapping data and calculation probabilistic distribution and quartiles, and publishing new distribution to engineering goal calculation.

In some embodiments, the storage component comprises at least a data base containing relevant data for the mapping processes.

In some embodiments, the distribution calculator software component has access to the storage component for storing the calculation results.

In some embodiments, there is an evaluation software component for subjecting the calculation results to a metric based ranking.

As another example, some embodiments include a computer program product comprising instructions which, when the program is executed by a computer, cause the computer to carry out the steps of the methods described herein.

As another example, some embodiments include provision apparatus for the computer program product as described herein, wherein the provision apparatus stores and/or provides the computer program product.

BRIEF DESCRIPTION OF THE DRAWINGS

The accompanying drawings are intended to provide a better understanding of the embodiments. They show embodiments and serve in conjunction with the description to explain principles and concepts of the disclosed subject matter. Other embodiments and many of the cited advantages will emerge in respect of the drawings. The elements of the drawings are not necessarily shown in scale with one another. Identical reference characters here designate identical components or components of comparable effect.

The properties, features, and advantages of various embodiments of the teachings herein described above and the manner in which they are achieved will become clearer and more distinctly comprehensible in conjunction with the description of the exemplary embodiments that follows, these being explained in more detail in conjunction with the FIGS. 1 to 6, in a schematic depiction.

DETAILED DESCRIPTION

Figure 1:
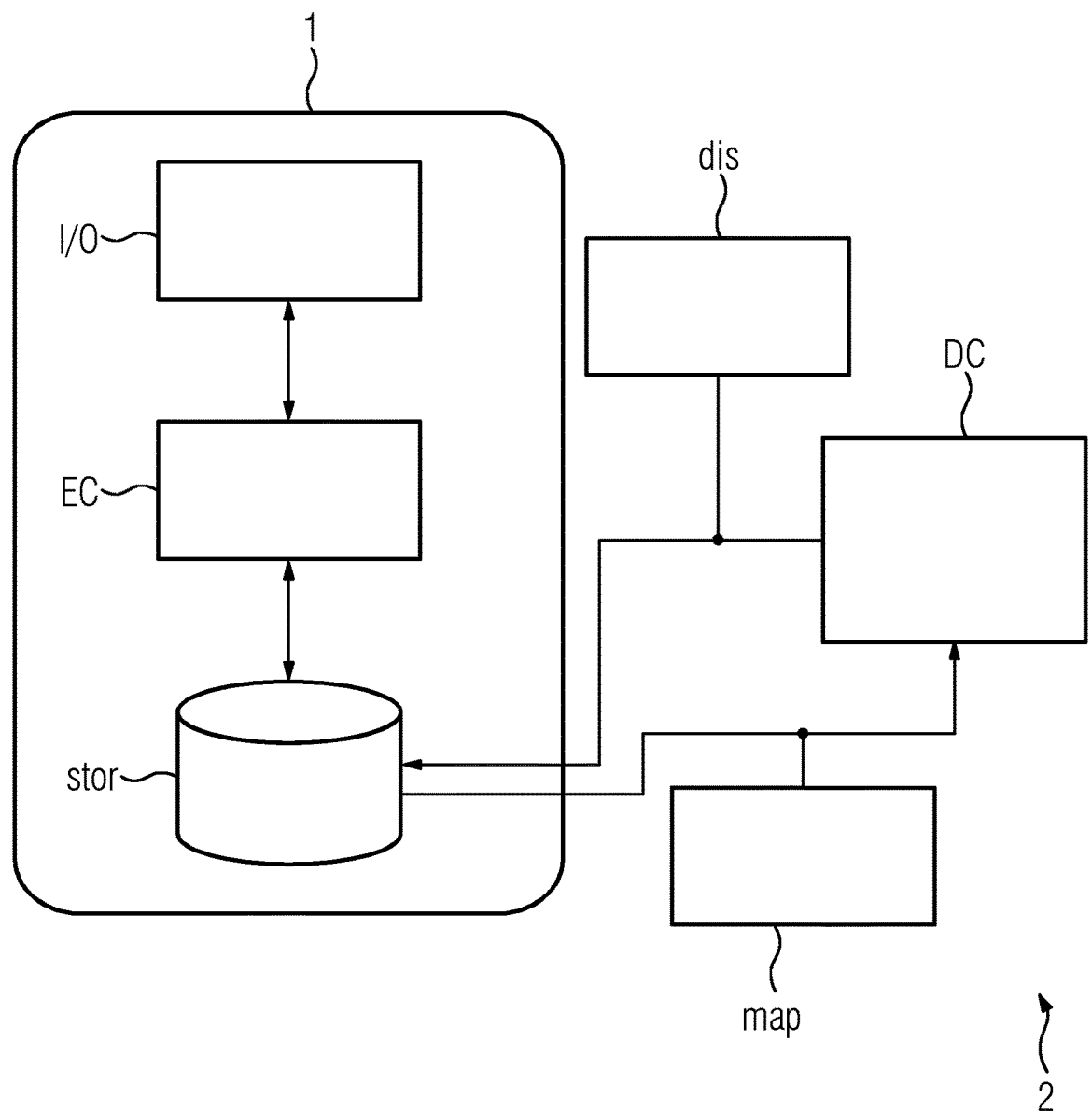
FIG. 1 shows a diagram for an exemplary alternative of the system divided in first and second subsystem 1, 2.

Some embodiments of the teachings of the present disclosure include a computer-implemented method for automatic derivation of attributes of software engineering artifacts, which attributes arise from technical boundary condition of product or service development segments, comprises the measures: Deduction of technical requirements by an automated software-based process based on classifications of the technical boundary conditions, mapping the deduced technical requirements of the artifacts to engineering disciplines and concerns by an automated software-based process, mapping the calculated engineering artifacts to responsibilities, adaption of the classification of the technical boundary conditions based on the evaluation results in iterations, processing an executable performing a distribution calculation (DC) of the classification space, wherein the distribution calculation (DC) of the classification space is at least based on a distribution and quartiles, wherein the process of the executable comprises the steps of calculation of the combination vectors at system start, reading mapping data and calculation probabilistic distribution and quartiles as well as publishing new distribution to engineering goal calculation. Segments meaning products or services or their development requirements can be described by several segments.

The embodiments described herein, in general, include methods and/or systems wherein the engineering goals are calculated by an integrated executable which calculates the underlying distribution. The calculation may be implemented in Excel in an adapted VBA script. Some embodiments include an achieved speed up to about 3 seconds compared to several minutes. No more system interruptions have to be dealt with and much higher stability may be provided.

In some embodiments, the reading and calculation step and the publishing step are separated. This provides that the separation of the steps allows the user to check the quality of the new distribution before using it. In some embodiments, there is a hidden performance improvement, since all excel calculation and updating can be switched off during the reading and calculation step. This could take minutes depending on size and complexity of the excel workbook during which excel is unresponsive and instable.

In some embodiments, the distribution calculation algorithm calculates the probability of a value in the distribution of a number of combinations and the quartiles underlying the engineering difficulty calculation are derived from the accumulated probabilities for each value. Instead of the occurrence of a value for each possible selection, which could be up to 2.2 million, the algorithms are preferably written in VBA and C++. For example, 512 combinations, representing the permutation of a selection vector (0/1) size n instead of approximately 2.2 million has the same result in distribution and quartiles, while n is the dimension of the solution space.

In some embodiments, the distribution calculation (DC) of the classification space is based on a calculation of a multi-selection in technical boundary taxa and a calculation of distribution and quartiles.

In some embodiments, the computer-implemented method further comprises the measures: normalization of the selection-counts, especially the multi-selection counts, creation of value-probability-pairs to calculate the probability of a value in the distribution calculation and a distribution calculation (DC) from these value-probability-pairs. In some embodiments, this provides a reduction of size of the frequency distribution. It's the n-time the normalization value instead of the product of maximum relation counts for each segment, while n is the number of dimensions of the solution space, e.g. n=9. The creation of value-probability-pairs especially is done for each segment. These pairs can be calculated in a linear algorithm from the normalized choice combinations in less than 5 ms in C++.

The values add up the probabilities multiply over the segments. The resulting probability is added to the respective value in a frequency distribution. As the value-probability-pairs are a lot less that the original relation counts or normalized relation counts for each segment, the algorithm is orders of magnitude faster. In C++ for example, single-threaded the calculation time is unnoticeable, less than 20 ms. In excel VBA e.g. it is below 1 second.

In some embodiments, the computer-implemented method further comprises the measures: Count data for frequency distribution per segment, prioritization of combinations to segment frequency distributions, combination of segment frequency distributions to a classification space frequency distribution. Frequency distribution may be displayed in histograms.

In some embodiments, the computer-implemented method further comprises the measure of horizontal stripping, wherein blocks of the solution space are given to separate threads by provided disjunct index subsets, therefrom resulting buffered frequency distributions are merged into the combined result in parallel by providing disjunct frequency distributions' values to the threads.

For example, a speedup is reached by the horizontal striping. Blocks of an n-dimensional solution space, in a preferred embodiment n=9, are given to separate threads by provided disjunct index subsets. The resulting buffered histograms are merged into the combined result in parallel e.g. by providing disjunct histogram values to the threads such that no synchronization is needed.

In a CPU based example, with current hardware 4 Kernels, the FPUs Speed up against single threaded is up to 25%. In a GPU based example, based on applied massive parallelism (amp), a 32 bit library doesn't scale as necc. For precise calculation 128 bit library is necessary. For validation, a multi-precision library is used with the advantage that number sizes can be set in the program as needed to overcome the fixed number sizes by usual programming languages and math libraries. Block based, like CPU, but with 50 to 100 time more threads like CPU-memory overhead makes it slow. Laptop GPUs, for example share their main memory with CPU and therefor are slower.

In some embodiments, the computer-implemented method further comprises the measure of vertical stripping, wherein two or more segments' frequency distributions are combined to a combined frequency distribution, which combined frequency distribution further is reduced to a value-probability-pair frequency distribution and wherein these combination and reduction steps are repeated until all product or service development segments are frequency distributions are combined.

As the combined histograms are very sparse the reduce step eliminates one or two orders of magnitude in input to the next combination step the overall algorithm is several orders of magnitudes faster than horizontal striping. For example, with 5 prioritization weights and 1000 as normalization factor it is less than 50 ms to almost estimated 7000 days or 206200 evaluated combinations to $1.32915 \cdot 10^{14}$ evaluated combinations, see FIG. 6. For example, the vertical striping algorithm can be implemented directly in VBA as is uses neither multi-threading nor GPU calls.

In some embodiments, the distribution calculation results are stored and evaluated for further subjecting the calculation results to a metric based ranking. In some embodiments, a computer system for automatic derivation of software engineering artifacts, comprises: a classifier software component for the classification of the technical boundary conditions, a calculation software component for the deduction of the technical requirements, a first mapping software component for mapping the technical requirements to engineering artifacts, an I/O-component for receiving the technical boundary conditions data and for providing the calculation results a storage component, and a distribution calculator software component for the distribution of the classifications, an executable performing a distribution calculation (DC) of the classification space, providing the distribution calculation (DC) of the classification space, which is at least based on a distribution and quartiles, wherein the executable comprises the further software components for calculation of the combination vectors at system start, reading mapping data and calculation probabilistic distribution and quartiles, publishing new distribution to engineering goal calculation. In some embodiments, the computer system consists of one system device. This may results in a speed up to about 3 seconds compared to several minutes. No more system interruptions are to be dealt with and higher stability is provided. The need for an external tool is eliminated.

With this approach, we no longer rely on advanced hardware, that would be limited to a couple of orders of magnitude. The presented method and system allow a speed up of 23 orders of magnitudes.

In some embodiments, the storage component comprises at least a data base containing relevant data for the mapping processes.

In some embodiments, the distribution calculator software component has access to the storage component for storing the calculation results.

In some embodiments, the computer system further comprises an evaluation software component for subjecting the calculation results to a metric based ranking.

In some embodiments, a computer program product includes program instructions which, when the program is executed by a computer, cause the computer to carry out the steps of the method as described herein.

In some embodiments, a provision apparatus for storing and/or providing the computer program product is a data storage medium that stores and/or provides the computer program product, for example. In some embodiments, the provision apparatus is a network service, a computer system, a server system, particularly a distributed computer system, a cloud-based computer system and/or a virtual computer system that stores and/or provides the computer program product preferably in the form of a data stream, for example.

This provision may be effected as a download in the form of a program data block and/or instruction data block, e.g. as a file, particularly as a download file, or a data stream, particularly as a download data stream, of the complete computer program product, for example. In some embodiments, the provision can be effected as a partial download that consists of multiple parts and is downloaded particularly via a peer-to-peer network or provided as a data stream, for example. Such a computer program product is read in, for example using the provision apparatus in the form of the data storage medium, in a system and executes the program instructions, so that the method programmed therein is executed on a computer, or configures the creation device such that it creates cited system and/or execution unit as described herein.

Definitions

Classification space in the context of this disclosure means space created by the classification vectors and their classification attributes. Classifications space are all possible selections. Size of the classifications space depends on the number of taxa (the dimensions) the number of different choices in the taxa the selection type (single, multiple, weighting).

Block(s) in the context of this disclosure means subspaces. It is a divide in conquer strategy to cope with a problem. Slice the input into homogenous independent blocks which are faster to calculate and can be calculated in parallel. Parallelization options in our cases are multicore CPUs Pipelining (FPU) and massive parallel GPUs.

A thread in the context of this disclosure is a single sequential flow of control within a program. In this case, we create for the blocks a separate thread and calculate in parallel using the parallelization option of the laptop.

Index subset(s): A way to define a block. Use ranges on selected dimensions to define subspaces.

Vertical stripping, means stripping along the dimensions: Opposite to horizontal stripping. While horizontal stripping uses subspaces by restricting one or more dimensions, in three dimensions, the metaphor is horizons like layers if we use the height dimension to separate subspaces. Vertical, however, means to tackle the dimensions separately and then the respective combinations. Another metaphor is the traversing of the problem-space.

Horizontal means a creation of e.g. three horizons by dividing the z-axis into three ranges. Then, there are three threads created, which calculate the three horizons separately in parallel before merging the results.

Vertical means splitting up the calculations on the axis: First one dimension, then two dimensions, then three dimensions. In all cases, the space is completely traversed, and all combinations calculated. The trick is to find a traversal path on which the amount of calculations gets low enough. In one example, there are 29 orders of magnitudes of growth to cope with between single select and weighted multiselect.

As used herein, the term a technical system refers, for example, to a device, apparatus or a plant. A technical system can, for example, be a field device, a generator or a power plant, e.g. a wind turbine, a solar power plant, or a water power plant. In some embodiments, the technical system comprises a plurality of hardware components and/or software components. Furthermore, the technical system can, for example, comprise at least one component having a communication interface configured to connect the inventive apparatus and/or a test environment.

Unless specifically stated otherwise, as apparent from the following discussions, it is appreciated that throughout the specification discussions utilizing terms such as processing, computing, computer-based, calculating, determining, generating, configuring or the like, refer to the action and/or processes of a computer that manipulates and/or transforms data into other data, said data represented as physical, e.g. such as electronic, quantities. The term computer should be expansively construed to cover any kind of electronic device with data processing capabilities, including, by way of non-limiting example, personal computers, servers, handheld computer systems, pocket PC devices, cellular communication device and other communication devices with computing capabilities, processors, and other electronic computing devices.

As used herein, the term processor refers, for example, to controllers, microcontrollers, e.g. digital signal processor (DSP) possibly in combination with memory and storage units memory unit storing computer-readable instructions, application specific integrated circuit ASIC, etc., processor cores, central processing units, integrated circuits/processing circuitry, e.g. application specific integrated circuit ASIC, field programmable gate arrays FPGA etc. or digital signal processors. Furthermore, the term processor can, for example, refer to virtual processors, virtual CPUs, soft processors or soft CPUs. Moreover, said processor can, for example, be configured to execute computer readable instructions such that said processor is preferably configured to perform functions which implement the invention.

As used herein, the term module refers, for example, to a processor and/or a memory unit storing computer-readable instructions. For example, the processor may be configured to execute the computer readable instructions such that said processor is configured to perform functions which implement the methods herein. Furthermore, the term module can, for example, refer to means, e.g. a processor, which are configured to implement/execute functions/steps of the methods.

As used herein, the term subtree, tree or the like, refer, for example, to data structures storing information about the technical system and/or components of the technical system. In some embodiments, the subtree is a branch of a (component fault) tree or a partial (component fault) tree, defined, for example, by a selected node in the tree as top level node of the subtree.

As used herein, the term model, component, failure mode and other elements of a component fault tree or the like, refer, for example, especially in conjunction with a subtree or tree to data structures containing information about the technical system and/or its components.

As used herein, the term acquisition module refers to a sensor or measurement equipment to measure a physical quantity. For example, an acquisition module can be a LIDAR to measure upcoming guests of wind and/or an acceleration sensor to measure the acceleration of the wind turbine and/or a speed sensor to measure a rotor speed of the wind turbine and/or a pitch angle sensor to measure a pitch angle of blades of a wind turbine and/or a power sensor to measure generated electrical power of a wind turbine and/or a speed sensor to measure an actual wind speed driving the wind turbine.

Some embodiments are implemented by a processor and/or a memory device unless otherwise noted. In detail, to implement and/or execute the invention, the inventive method, components, devices etc. comprise at least one processor and/or at least one memory device unless otherwise noted. Additionally, the inventive method, components, devices etc. comprise, for example, other features known by a skilled person. For example, these features can be an input device, like a computer mouse, or a display device, like a TFT-display.

In some embodiments, the computer-implemented method for successful implementations of projects, product or service developments or even of new business models demands contains a scalable and reproducible deduction of technical concerns. The provided semi-automated method for example helps to define cornerstones of an engineering strategy by determining the minimal needed quality of core artifacts of the engineering and operation process, like requirements, enterprise architecture, source code, test strategy, test plan, change requests, etc. These artifacts can be part of an engineering canvas, for example comprising several building blocks like requirements management, architecture management, etc., see tabular 1.

TABLE 1

Example of Interface: Assignment Software Engineering
Building Blocks (SEBB) to quality levels

| Requirements managements | Architecture management | Software implementation | Test | Delivery & Deployment | Operations management | Maintenance | | |
|---|---|---|---|---|---|---|---|---|
| 1.5 | 2 | 2 | 2 | 2 | 2 | 2 | | Basic Engineering Quality |
| 4 | 4 | 4 | 4 | 4 | 4 | 4 | | Peak Engineering Quality |
| 2 | 4 | 2 | 1 | 2.5 | 4 | 4 | Min | Automation grade |
| 3 | 4 | 4 | 4 | 4 | 4 | 4 | Max | Automation grade |
| 2 | 4 | 3 | 3 | 4 | 4 | 4 | Min | 3 |
| 4 | 4 | 4 | 4 | 4 | 4 | 4 | Max | Estimation capability |

In some embodiments, the method comprises two main processes. On the one hand, the process definition. First, there are basic definitions like roles, artifacts, engineering concerns, building block refinements, representing the taxa for classification, to be considered. Further, there is an initial concept or canvas concerning a product or service idea, there are relationships, mapping to engineering concerns, software engineering canvas, and an artifact role mapping. These are complemented by a validation of the definition and mappings, e.g. completeness and variance. Finally, there could be an evaluation by examples. On the other hand, the method comprises the process Goal derivation. In tabular 1 for example, a results' overview of the top-level engineering goals is shown.

Needed quality of an artifact means that it has to contain specific information items and, depending on the quality levels, quantitative data that helps to control the development process and the maturity and completeness of the artifacts. The method may be focused on artifacts, not on the process how these artifacts are created and maintained and can therefore be used regardless of the underlying development process.

In a first step, technical boundary conditions are identified and classified. Then, the technical requirements are deduced in an automated software-based process. The relations between specific building block refinements of the initial concept con and the requirement types req are defined and justified by a so-called Mapping map-con, see FIG. 4. This step is based on a model that allows selecting the major characteristics of new projects, product or service developments or even of new business models. This model can be implemented in Microsoft Excel. For users' selections, single selections in drop down boxes are preferably provided. The deduced technical requirements can be classified in requirement types that have an impact on implementation, operation of products and services or even the design.

Concerning the before mentioned quality levels, an overall requirements severity for a project, product or service development is calculated based on this selection. This requirements severity level for example is between 0 and 4 and defines the minimum quality to be achieved, and therefore the minimum content that the key artifacts of the project, product or service development have to contain. Additionally, suggestions for quality levels can be calculated for the distinct key artifacts of an engineering project.

The requirements, a test plan, source code etc can define different impacts on the needed content and quality of the distinct artifacts. Specifying the required quality levels of the key artifacts that are for example organized along major phases of a software development project, can be based on a software engineering template.

Figure 4:
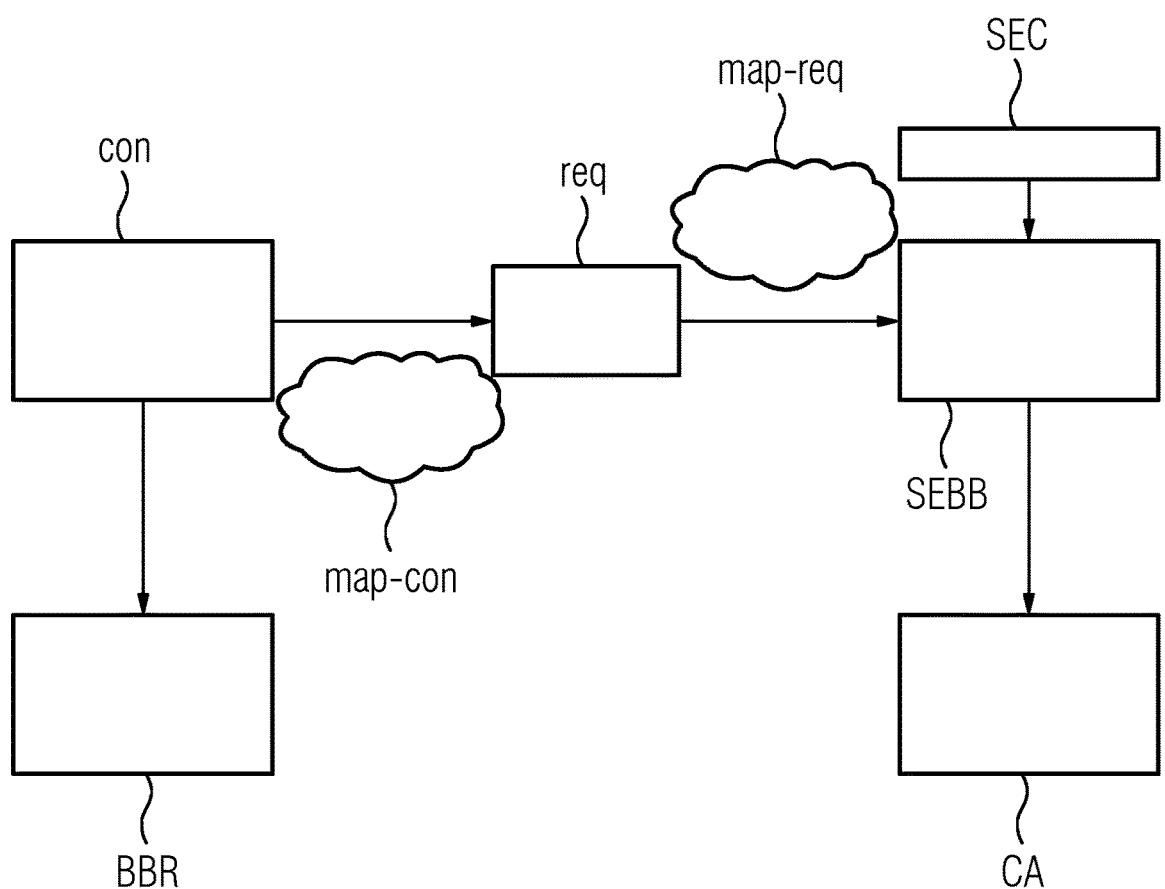
FIG. 4 shows the relations between the method steps.

In a further step of this automated software-based process, these technical requirements are mapped to engineering artifacts and concerns, see FIG. 4, map-con. For the automated calculation of quality levels, a number of mappings are defined in the before mentioned model. Different Requirement Types req are derived from different content and quality that is needed for the artifacts of a project. E.g., the requirements complexity is much higher when dealing with a complex multi-level project. The mapping of the requirement types for example to a software engineering template defines a minimum quality level for the key software artifacts based on the characteristics of the requirement types. In an embodiments the deduced engineering artifacts are further mapped to responsibilities. This process can be followed by an evaluation step, see tabular 2, that is based on software metrics. In an embodiment, the evaluation results are used to adapt the initial classification of the technical boundary conditions in several iterations.

TABLE 2

Definition process

| Basic definitions | Mappings | Distribution | Plausibility checks | Evaluation |
|---|---|---|---|---|
| Artifacts Roles Concept elements Engineering concerns Metrics (in first subsystem 1) | Concept-to-Engineering concerns Software engineering template Artifact-quality-mapping Artifact-automation-mapping Valuation mapping Collaboration mapping (in first subsystem 1) | Concept- and Engineering goal calculation EC (in second subsystem 2) | Completeness Statistics | Test scenarios |

As shown in FIG. 4, the model does not draw a direct relation between an initial concept and the software engineering template SEC, but uses so called requirements types req to decouple the two sides in order to reduce the effort for defining and describing the relationships between. Furthermore, the requirements types req help in narrowing the semantic gap. A major benefit is the refinement of the problem space and an improvement of the mapping characteristics. The requirement types req are kind of a middle-tier that facilitates relating a development concept with a software engineering canvas SEC. The requirement types req classify a software or system service or a software product from various key demands, like functional suitability, functional quality, engineering quality, and operational quality. Depending on the importance of the individual requirement types req this has an impact on the way development and operations of a service have to be carried out.

The defined mappings, map-con, map-reg, relate every element of the method to each other, see FIG. 4. In the first place, there is a concept, con, for example a project idea, a development plan, a business model canvas, which comprises several Building blocks BB or Building Block Refinements BBR. In the concept-to-requirements-mapping, map-con, technical requirements req are deduced in an automated software-based process.

The concrete form of the concept con, how complex or multi-sided it is, has an impact on the requirement types, e.g. requirements' complexity, resulting in different content and quality that is needed for the artifacts of a project, compare tabular 3. Both mappings, map-con, map-reg, for example provide an automated calculation of the quality levels respectively.

In the requirements-to-engineering-artifacts-mapping, map-req, technical requirements are mapped to engineering artifacts. In the field of software engineering, this mapping defines a minimum quality level for the key software artifacts based on the characteristics of the requirement types. The requirements-to-engineering-artifacts-mapping, map-req, for example results in software engineering building blocks SEBB. With respect to an underlying software engineering canvas SEC and the derived software engineering building blocks SEBB core artifacts CA are obtained. For each key software or role artifact CA and for each quality level respectively, the necessary roles for developing and maintaining the artifact as well as which roles should use the artifact in order to be able to fulfil the tasks of the role are defined.

Generally, any mapping is explicitly specified and can be modified, e.g. in the model, in order to better reflect the needs of a specific organization or division. Such modifications would also allow, to remove or add requirement types, to change the impact of the concept elements on the requirement types, to change the minimum required quality level for key software artifacts, to add or remove key artifacts, and to redefine the required roles for each artifact.

TABLE 3

Automated derivation process

| Concept Classification | Engineering difficulty | Artifact related goals |
| --- | --- | --- |
| Select on entry of each segment of the initial concept of project idea, development plan, business model canvas | Calculate the value for each engineering concern map-con, and relate using the distribution of all possible elections. | Quality Automation grade Evaluation capability Artifact collaboration |
| | Aggregate the ratings over all engineering concerns (Average) | |

Figure 2:
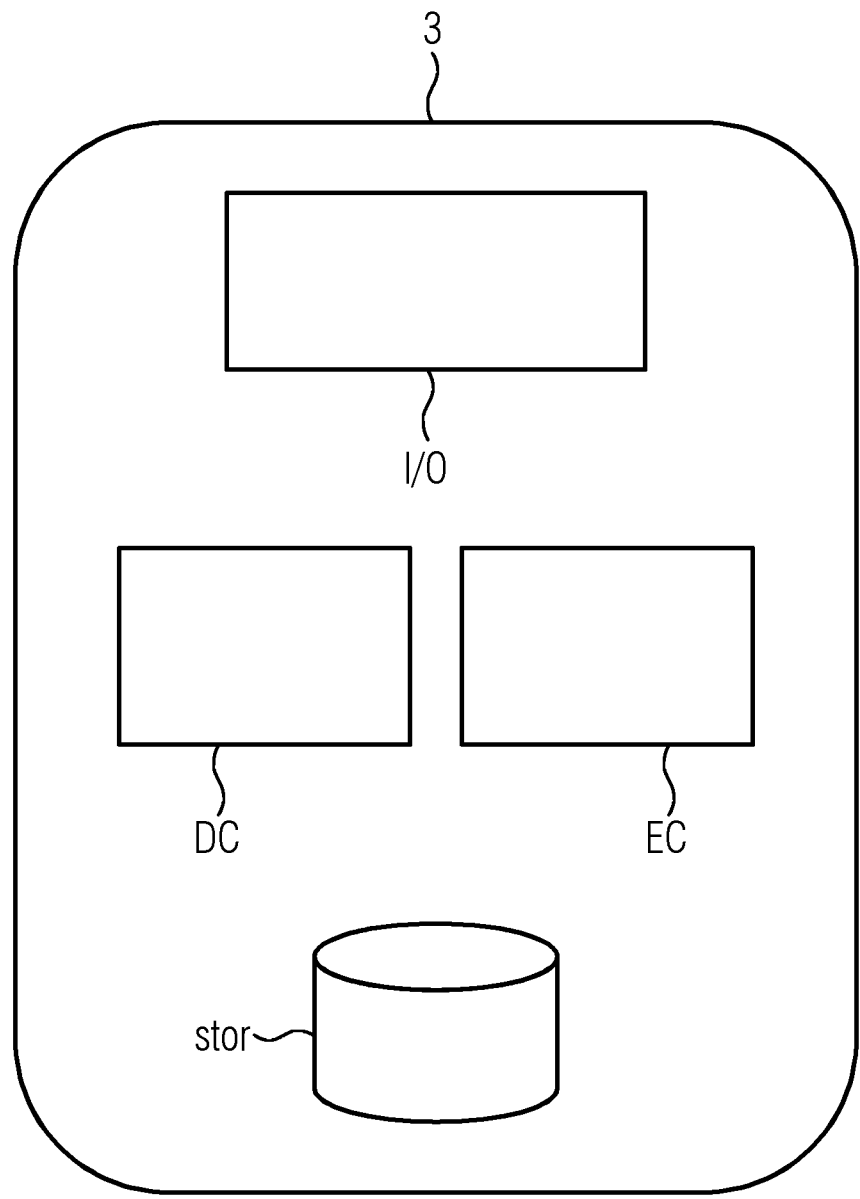
FIG. 2 shows a diagram for an exemplary embodiment of the system as an integrated system 3 with integrated DC and EC.
Figure 3:
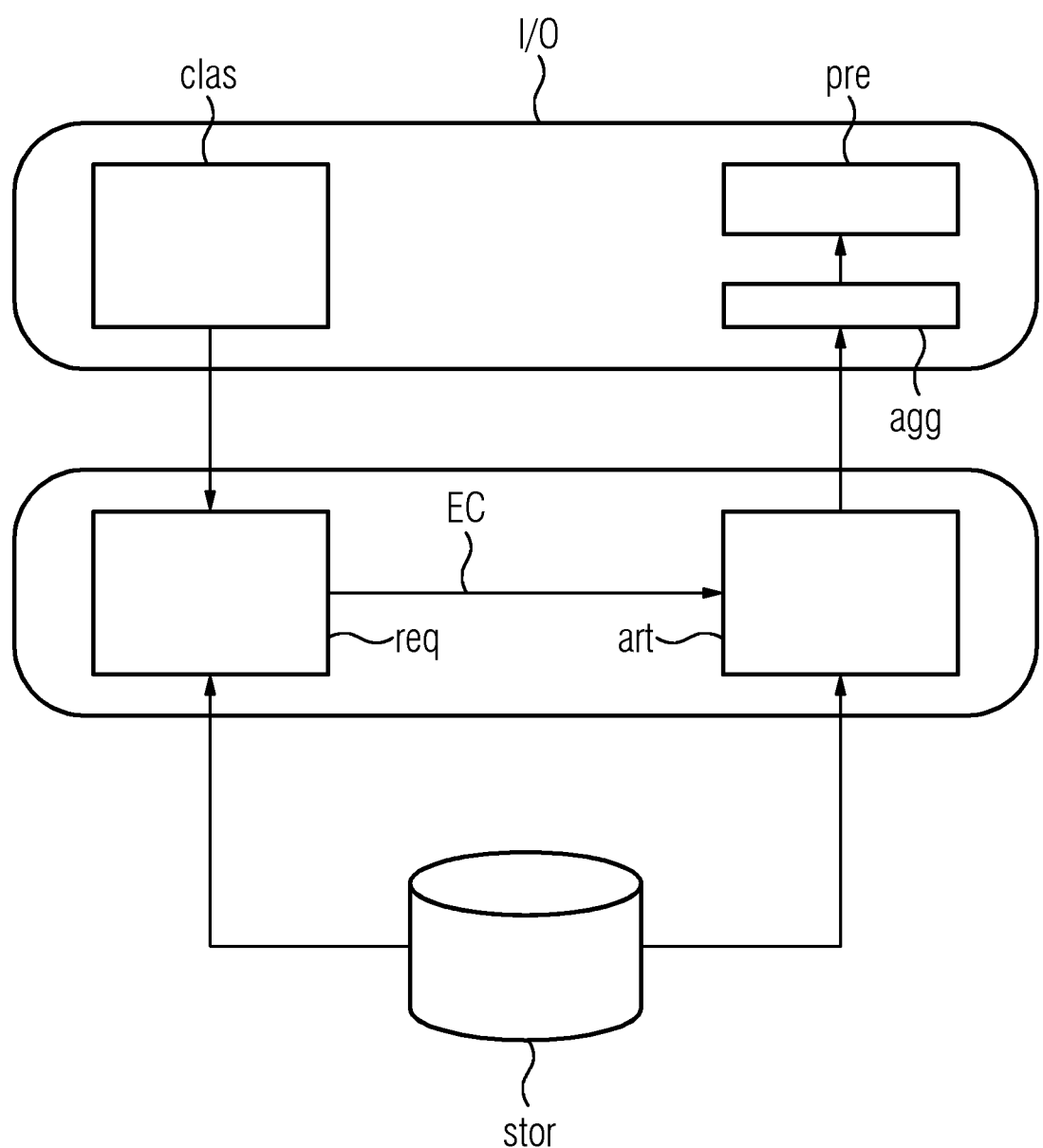
FIG. 3 shows the interaction between components and layers.

The provided method may be executed by a computer system, see FIGS. 1, 2, and 3, comprising a classifier software component, clas, for the classification of the technical boundary conditions, a calculation software component, map-con, for the deduction of the technical requirements, req, and at least one mapping software component, map-req, for mapping the technical requirements to engineering artifacts, disciplines and concerns. The computer system further comprises an I/O-component, I/O, for receiving the technical boundary conditions data and for providing the calculation results, especially for the input of classification and mapping data and for the output of engineering goals and respective mappings. The computer system comprises at least a storage component, stor, the storage component e.g., comprising at least a data base containing relevant data for the mapping processes. In the storage component, stor, basic definitions, mappings and distributions are stored. In some embodiments, these components are combined in a first subsystem while a second subsystem provides a distribution calculator software component DC for the distribution of the classifications, which is a calculation of single-, multi-, weighted multi-selection combinations and/or a calculation of distribution and quartiles. FIG. 4 shows an example embodiment, in which the system is no longer divided but integrated to one complete system 3, comprising the distribution calculator software component DC beside the evaluation software component EC for subjecting these results to a metric based ranking. The distribution calculation results are stored in the storage component, stor. The I/O-component provides scalable and reproducible calculation results.

Figure 5:
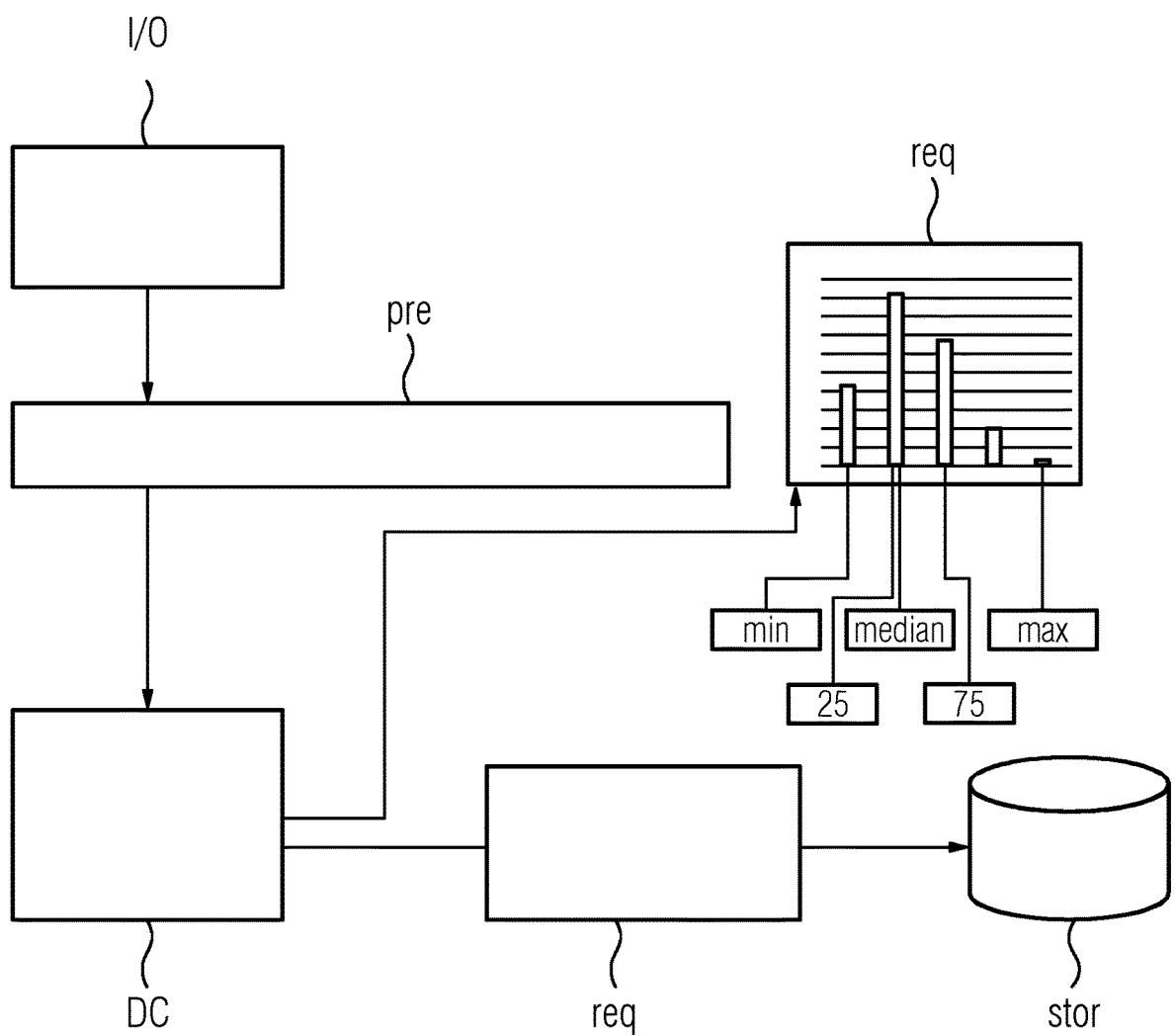
FIG. 5 shows a diagram for the distribution calculation DC interaction with modules I/O and storage.

FIG. 5 shows a diagram for the distribution calculation DC interaction with the interface module I/O and storage module, stor. In some embodiments, the interface component I/O provides input of classification and mapping data to the distribution calculation DC. The distribution calculation module DC uses the mapping, map-con, between concept and engineering concerns to calculate a distribution of all possible classifications, req. This resulting distribution is created and stored to the datastore, store. In the calculation of the distribution and quartiles, all combinations can be enumerated using an odometer with a digit for each segment of the concept, con. The digits run from 0 to a number of combinations in a segment. The value of a combination is the sum of the values of all selected refinements. For all combination values, a histogram of the distribution is created for the quartiles to be calculated easily. The overall number of combinations is the product of all segment combinations. We create a distribution for each engineering concern. The interface component I/O further provides the output of engineering goals and mappings to a user.

The system provides an automated mapping between a concept, con, and artifact-based engineering goals. Selections in the concept segments are provided to the system as input data. Output, for example, are artifact-names with quality grade, automation grade and estimations capability. Grades are aggregated at discipline and organization level to provide an overview.

The main challenge of the described method is to bridge the semantic gap between concept and engineering artifacts in a comprehensible way for the definition of the mapping and the evaluation of a concept selection. Therefor mappings between intermediate values are provided, like the concept-to-requirements-mapping, map-con, and the requirements-to-engineering-artifacts-mapping, map-req, but also further mappings from a software engineering canvas, SEC, to artifact quality, automation grade and/or evaluation capability.

In some embodiments, the method provides a fully automated calculation, which limits are based on calculated quartiles and not randomly defined. In some embodiments, the computer-implemented method for successful implementations of projects, product or service developments or even of new business models demands, contains a scalable and reproducible deduction of technical concerns. After the identification and classification of the technical boundary conditions, in a first step, technical requirements are deduced in an automated software-based process. In a further step of this automated software-based process, these technical requirements are mapped to engineering artifacts and concerns. In some embodiments, the deduced engineering artifacts are further mapped to responsibilities. This process can be followed by an evaluation step that is based on software metrics. In some embodiments, the evaluation results are used to adapt the initial classification of the technical boundary conditions in several iterations.

In some embodiments, the method is suitably executed by a computer system comprising a classifier software component for the classification of the technical boundary conditions, a calculation software component for the deduction of the technical requirements and at least one mapping software component for mapping the technical requirements to engineering artifacts, disciplines and concerns. The computer system further comprises an I/O-component for receiving the technical boundary conditions data and for providing the calculation results. The computer system comprises at least a storage component, the storage component e.g. comprising at least a data base containing relevant data for the mapping processes. In some embodiments, a distribution calculator software component for the distribution of the classifications is comprised, which is a calculation of single-selection combinations and/or a calculation of distribution and quartiles. The distribution calculation results are stored in the storage component. In some embodiments, the system further comprises an evaluation software component for subjecting these results to a metric based ranking. The I/O-component provides scalable and reproducible calculation results. In some embodiments, these components are combined in on integrated system.

Tabulars 4 to 7 show interactive process steps, main process steps (top) to optional substeps. The provided process and system allow a continuous sequence without interruptions and waiting periods for any distribution calculation DC. The example in tabulars 4 to 7 shows an expenditure of time of less than 100 ms. In this example, a business model is mapped to an engineering strategy. The substeps are the derivation of requirement types, the engineering canvas and the mapping to artifact roles, automation level and evaluation of costs and benefits. Software engineering disciplines are used as underlying structure.

TABLE 4

Algorithms
max value 90
multi_select_weighted_sel_prio_loop_frac_mpp

| | #prio 3 | | | | |
|---|---|---|---|---|---|
| #coms | 1.1679E+16 | 1.0871E+17 | 9.8196E+17 | 8.8412E+18 | 7.9575E+19 |
| #histo | 1.967750E+08 | 2.164525E+08 | 2.164525E+08 | 2.164525E+08 | 2.164525E+08 |
| time | 0.415773 | 0.434509 | 0.445460 | 0.468525 | 0.469892 |
| norm hist | 0.211293 | 0.200741 | 0.205800 | 0.216456 | 0.217088 |
| | #prio 4 | | | | |
| #coms | 5.080 6E+19 | 8.2499E+20 | 1.3212E+22 | 2.1140E+23 | 3.3825E+24 |
| #histo | 365,263,668 | 365,263,668 | 365,263,668 | 365,263,668 | 365,263,668 |
| time | 0.814492 | 0.719422 | 0.722691 | 0.717022 | 0.712348 |
| norm hist | 0.222987 | 0.196960 | 0.197855 | 0.196303 | 0.195023 |
| | #prio 5 | | | | |
| #coms | 3.3193E+22 | 8.3 62 5E+23 | 2,0913E+25 | 5.22 82E26+ | 1.3071E+28 |
| #histo | 824,581,120 | 824,581,120 | 824,581,120 | 824,581120, | 824,581,120 |
| time | 1.748365 | 1.668046 | 1.640520 | 1.610369 | 1.692916 |
| norm hist | 0.212031 | 0.202290 | 0.198952 | 0.195295 | 0.205306 |
| | #prio 6 | | | | |
| #coms | 6.5954E+24 | 2.3851E+260000 | 8.5874E+27 | 3.0915E+29 | 1.1129E+31 |
| #histo | 1,043,610,480 | 1,043,610,480 | 1,043,610,480 | 1,043,610,480 | 1,043,610,480 |
| time | 2.057919 | 2.113441 | 2.144817 | 2.201766 | 2.079684 |
| norm hist | 0.197192 | 0.202512 | 0.205519 | 0.210976 | 0.199278 |
| | #prio 7 | | | | |
| #coms | 5.7761E+26 | 2.8384E+28 | 1.3909E+30 | 6.8154E+31 | 3.3396E+33 |
| #histo | 1,434,964,410 | 1,434,964,410 | 1,434,964,410 | 1,434,964,410 | 1,434,964,410 |
| time | 2.962767 | 2.840059 | 2.874126 | 2.799133 | 3.042038 |
| norm hist | 0.206470 | 0.197918 | 0.200292 | 0.195066 | 0.211994 |

TABLE 5

| | Max value | | | | |
|---|---|---|---|---|---|
| | 4 | 16 | 30 | 43 | 56 |
| | multi_select_weighted_sel_prio_#prio 3 | | | | |
| #coms | 1.1679E+16 | 1.0871E+17 | 9.8196E+17 | 8.8412E+18 | 7.9575E+19 |
| #histo | 196,775,040 | 216,452,544 | 216,452,544 | 216,452,544 | 216,452,544 |
| time | 0.000170 | 0.000177 | 0.000191 | 0.000257 | 0.000421 |
| norm hist | 0.000087 | 0.000082 | 0.000088 | 0.000119 | 0.000195 |
| | multi_select_weighted_sel_prio_#prio 4 | | | | |
| #coms | 5.0806E+19 | 8.2499E+20 | 1.3212E+21 | 2.1140E+22 | 3.3825E+24 |
| #histo | 365,263,668 | 365,263,668 | 365,263,668 | 365,263,668 | 365,263,668 |
| time | 0.000208 | 0.000225 | 0.000245 | 0.000317 | 0.000518 |
| norm hist | 0.000057 | 0.000062 | 0.000067 | 0.000087 | 0.000142 |
| | multi_select_weighted_sel_prio_#prio 5 | | | | |
| #coms | 3.3193E+22 | 8.3 62 5E+23 | 2.0913E+25 | 5.2282E+26 | 1.3071E+28 |
| #histo | 824,581,120 | 824,581,120 | 824,581,120 | 824,581,120 | 824,581,120 |
| time | 0.000246 | 0.000268 | 0.000295 | 0.000368 | 0.000646 |
| norm hist | 0.000030 | 0.000033 | 0.000036 | 0.000045 | 0.000078 |
| | multi_select_weighted_sel_prio_#prio 6 | | | | |
| #coms | 6.5954E+24 | 2.3851E+26 | 8.5874E+27 | 3.0915E+29 | 1.1129E+31 |
| #histo | 1,043,610,480 | 1,043,610,480 | 1,043,610,480 | 1,043,610,480 | 1,043,610,480 |
| time | 0.000341 | 0.000375 | 0.000433 | 0.000530 | 0.000929 |
| norm hist | 0.000033 | 0.000036 | 0.000041 | 0.000051 | 0.000089 |
| | multi_select_weighted_sel_prio_#prio 7 | | | | |
| #coms | 5.7761E+26 | 2.8384E+28 | 1.3909E+30 | 6.8154E+31 | 3.3396E+33 |
| #histo | 1,434,964,410 | 1,434,964,410 | 1,434,964,410 | 1,434,964,410 | 1,434,964,410 |
| time | 0.000400 | 0.000438 | 0.000510 | 0.000606 | 0.000889 |
| norm hist | 0.000028 | 0.000031 | 0.000036 | 0.000042 | 0.000062 |

TABLE 6

| | | | | | |
|---|---|---|---|---|---|
| | 1.1679E+16 | 1.0871E+17 | 9.8196E+17 | 8.8412E+18 | 7.9575E+19 |
| | 2.634224E+12 | 5.870556E+12 | 6.547927E+12 | 6.999509E+12 | 7.225299E+12 |
| sec | 5718.57 | 12744.24 | 14214.73 | 15195.06 | 15685.22 |
| days | 0.066187 | 0.147503 | 0.164522 | 0.175869 | 0.181542 |
| | 5.0806E+19 | 8.2499E+20 | 1.3212E+22 | 2.1140E+23 | 3.3825E+24 |
| | 21,185,315,424,000 | 33,407,612,784,000 | ,992,000 | 38,703,941,640,000 | 39,926,171,376,000 |
| sec | 41316.25 | 65152.54 | 72303.43 | 75481,60 | 77865.23 |
| days | 0.478197 | 0.754080 | 0.836845 | 0.873630 | 0.901218 |
| | 3.3193E+22 | 8.3625E+23 | 2.0913E+25 | 5.2282E+26 | 1.3071E+28 |
| | 81,897,207,427,035 | 118,146,791,042,280 | 124,859,676,896,955 | 126,202,254,067,890 | 132,915,139,922,565 |
| sec | 168140.03 | 242562.66 | 256344.63 | 259101.03 | 272883.00 |
| days | 1.946065 | 2.807438 | 2.966952 | 2.998854 | 3.158368 |
| | 6.5954E+24 | 2.3851E+26 | 3.0915E+29 | 3.0915E+29 | 1.1129E+31 |
| | 217,948,449,364,800 | 312,861,483,765,600 | 344,499,161,899,200 | 344,499,161,899,200 | 348,014,459,469,600 |
| sec | 434322.79 | 623463.36 | 686510.22 | 686510.22 | 693515.42 |
| days | 5.026884 | 7.216011 | 7.945720 | 7.945720 | 8.026799 |
| | 5.7761E+26 | 2.8384E+28 | 1.3909E+30 | 6.8154E+31 | 3.3396E+33 |
| | 586,925,932,965,372 | 743,990,619,251,880 | 793,589,993,868,672 | 810,123,118,740,936 | 834,922,806,049,332 |
| sec | 1244247.58 | 1577215.24 | 1682362.92 | 1717412.15 | 1769985.99 |
| days | 14.401014 | 18.254806 | 19.471793 | 19.877455 | 20.485949 |

TABLE 7

| | Max value | | | | |
|---|---|---|---|---|---|
| | 134 | 147 | 160 | 173 | 186 |
| #combs | 1.1679E+16 | 1.0871E+17 | 9.8196E+17 | 8.8412E18+ | 7.9575E+19 |
| #histo | 2,634,223,653,60 | 5, 870,555,570,880 | 6,547,927,367,520 | 6,999,508,565,280 | 7,225,299,164,160 |
| Time | 0.000749 | 0.000860 | 0.000895 | 0.000951 | 0.001135 |
| Norm hist | 2.843722E-08 | 1.465108E-08 | 1.367456E-08 | 1.357952E-08 | 1.571423E-08 |
| #combs | 5.080 6E+19 | 8.2499E+20 | 1.3212E+22 | 2.1140E+23 | 3.3825E+24 |
| #histo | 21,185,315,424,000 | 33,407,612,784,000 | 37,074,301,992,000 | 38,703,941,640,000 | 39, 926, 171,376, 000 |
| Time | 0.000867 | 0.000949 | 0.001083 | 0.001080 | 0.001257 |
| Norm hist | 4.090569E-09 | 2.839173E-09 | 2.920082E-09 | 2.790930E-09 | 3.148060E-09 |
| #combs | 3.3193E+25 | 8.3 62 5E+23 | 2.0913E+25 | 5.22 82E+36 | 1.3071E+28 |
| #histo | 81,897,207,427,035 | 118,146,791,042,280 | 124,859,676, 896,955 | 126,202,254,067,90 | 132,915,139,922,565 |
| Time | 0.000963 | 0.001038 | 0.001061 | 0.001166 | 0.001352 |
| Norm hist | 0.000000 | 0.000000 | 0.000000 | 0.000000 | 0.000000 |
| #combs | 6.5954E+24 | 2.3851E+26 | 3.0915E+29 | 3.0915E+29 | 1.1129E+31 |
| #histo | 217,948,449,364,800 | 312,861,483,765,600 | 344,499,161,899,200 | 344,499,161,899,200 | 348,014,459,469,600 |
| Time | 0.001052 | 0.001173 | 0.001184 | 0.001305 | 0.001581 |
| Norm hist | 4.824994E-10 | 3.747665E-10 | 3.437454E-10 | 3.788108E-10 | 4.543202E-10 |
| #combs | 5.7761E+26 | 2.8384E+28 | 1.3909E+30 | 6.8154E+31 | 3.3396E+33 |
| #histo | 586,925,932,965,372 | 743,990,619,251,800 | 793,589,993,868,672 | 810,123,118,740,936 | 834,922,806,049,332 |
| Time | 0.001174 | 0.001259 | 0.001318 | 0.001439 | 0.001703 |
| Norm hist | 1.999571E-10 | 1.692226E-10 | 1.660933E-10 | 1.776644E-10 | 2.039350E-10 |

Figure 6:
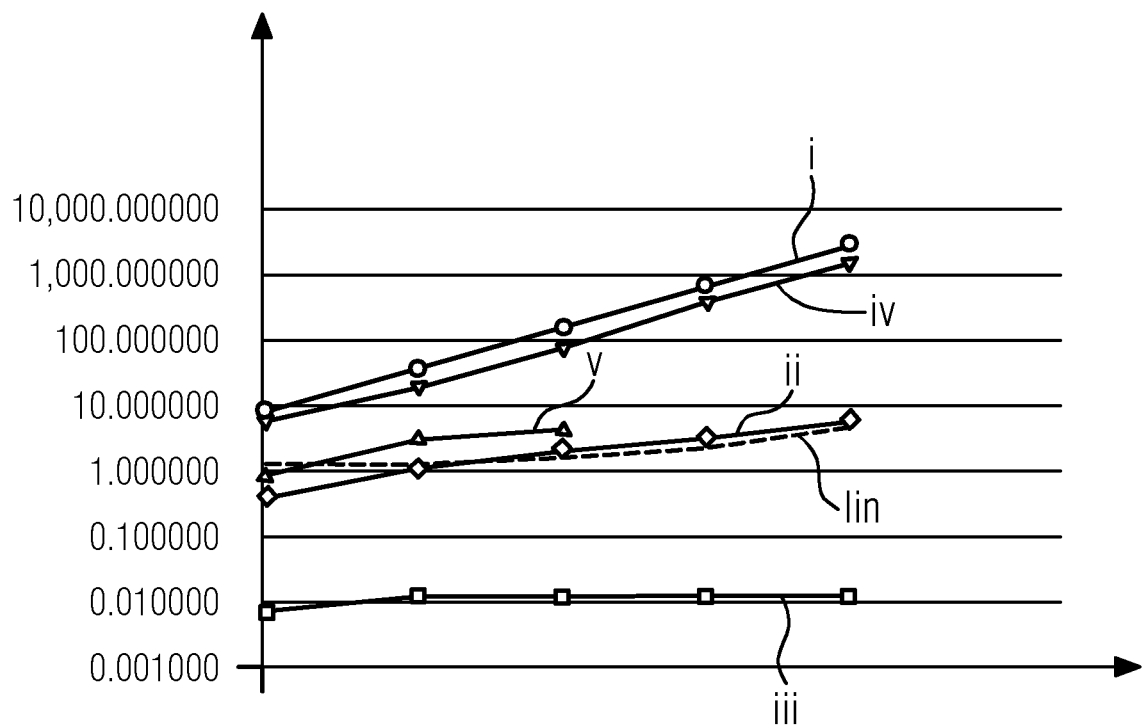
FIG. 6 shows performance values of an example computer-implemented process incorporating teachings of the present disclosure.

FIG. 6 shows performance values of the computer-implemented process. Average performance values for different embodiments are plotted:

i number of counted loops for multi-selection
ii number of counted loops for multi-selection fractions
iii number of counted loops for weighted multi-selection
iv number of counted loops for multi-selection mpp, as i but with 4 parallel threads on CPU
v number of counted loops for multi-selection amp, as i but with GPU
lin linear fit Fractions, meaning fractions of all possible combinations. Disadvantage can be rounding errors getting too large for weighted multi-selection. Amp stands for accelerated massive parallelism. Disadvantage can be not even working for multi-selection but to integer size constraints.

In some embodiments, using a VBA script, the process of the executable is spilt up into 3 steps: First, the calculation of the combination vectors at system start. This is a background process running unnoticed by a user. Second step is the reading of the mapping data and the calculation of probabilistic distribution and quartiles, which takes less than 2 seconds, followed by the publishing of the new distribution to engineering goal calculation, which itself takes less than 1 second. Optional, second and third step is separated to allow the user to check the quality of the new distribution before using it. Hidden performance advantage may be achieved by switching of all excel calculation and updating during step 2. This otherwise could take minutes depending on size and complexity of the excel workbook during which excel would be unresponsive and instable.

LIST OF REFERENCE SIGNS

EC Engineering goal calculator/calculation
DC Distribution calculator/calculation, Definition
stor Data storage
dis Distributor, e.g. project distribution
I/O Input/Output, user interface
clas Classification, e.g. project classification
pre presentation
agg aggregator
req requirements, e.g. engineering requirements
art artifacts, e.g. quality, automation, grade, valuation, collaboration
1 first subsystem
2 second subsystem
3 integrated system
con concept, e.g. project idea, development plan, business model canvas, comprising several/up to . . . Building blocks (BB)
BBR Building Block Refinements
SEBB Software Engineering Building Blocks
map-con concept-to-requirements-mapping: technical requirements are deduced in an automated software-based process
map-req requirements-to-engineering-artifacts-mapping: technical requirements are mapped to engineering artifacts
CA core artifacts
i-v different embodiments
lin linear fit

The invention claimed is:

1. A computer-implemented method for automatic derivation of attributes of software engineering artifacts, which attributes arise from technical boundary conditions of product or service development segments, the method comprising:

deducing technical requirements using an automated software-based process based on classifications of the technical boundary conditions;
mapping the deduced technical requirements of the artifacts to engineering disciplines and concerns using an automated software-based process;
mapping the engineering artifacts to responsibilities;
adapting the classification of the technical boundary conditions based on evaluation results in iterations; and
processing an executable performing a distribution calculation of a classification space, wherein the distribution calculation of the classification space is at least based on a distribution and quartiles;
wherein the process of the executable comprises:
calculating combination vectors at system start;
reading mapping data and calculation probabilistic distribution and quartiles; and
publishing new distribution to engineering goal calculation.

2. A computer-implemented method according to claim 1, wherein the reading and calculation step are separated from the publishing step.

3. A computer-implemented method according to claim 1, wherein:
the distribution calculation algorithm calculates a probability of a value in the distribution of a number of combinations; and
the quartiles underlying the engineering difficulty calculation are derived from the accumulated probabilities for each value.

4. A computer-implemented method according to one of claim 1, wherein the distribution calculation of the classification space is based on a calculation of a multi-selection in technical boundary taxa and a calculation of distribution and quartiles.

5. A computer-implemented method according to claim 4, further comprising:
normalizing the selection-counts;
creating value-probability-pairs to calculate the probability of a value in the distribution calculation; and
calculating a distribution from these value-probability-pairs.

6. A computer-implemented method according to one of claim 1, further comprising:
counting data for frequency distribution per segment,
prioritizing combinations to segment frequency distributions; and
combining segment frequency distributions to a classification space frequency distributions.

7. A computer-implemented method according to claim 6, further comprising:
horizontal stripping, wherein blocks of the solution space are given to separate threads by provided disjunct index subsets; and
merging therefrom resulting buffered frequency distributions into the combined result in parallel by providing disjunct frequency distributions' values to the threads.

8. A computer-implemented method according to claim 5, further comprising vertical stripping;
wherein 2 or more segments' frequency distributions are combined to a combined frequency distribution;
reducing combined frequency distribution further to a value-probability-pair frequency distribution; and
wherein these combination and reduction steps are repeated until all product or service development segments are frequency distributions are combined.

9. A computer-implemented method according to claim 1, further comprising storing and evaluating the distribution calculation results for further subjecting the calculation results to a metric based ranking.

10. A computer system for automatic derivation of software engineering artifacts, the system comprising:
a classifier software component for classification of technical boundary conditions;
a calculation software component for deducing the technical requirements;
a first mapping software component for mapping the technical requirements to engineering artifacts;
an I/O-component for receiving the technical boundary conditions and for providing the technical requirements;
a storage component;
a distribution calculator software component for calculating a distribution of a classification space;
an executable performing a distribution calculation of the classification space, and providing the distribution calculation of the classification space, which is at least based on a distribution and quartiles;
wherein the executable comprises further software components for calculation of combination vectors at system start, reading mapping data and calculation probabilistic distribution and quartiles, and publishing new distribution to engineering goal calculation.

11. A computer system according to claim 10, wherein the storage component comprises a data base containing relevant data for the mapping processes.

12. A computer system according to claim 10, wherein the distribution calculator software component has access to the storage component for storing the calculation results.

13. A computer system according to claim 10, further comprising an evaluation software component for subjecting the calculation results to a metric based ranking.

* * * * *